(12) United States Patent
Ohmoto

(10) Patent No.: US 8,678,578 B2
(45) Date of Patent: Mar. 25, 2014

(54) INK-JET PIGMENT INK AND INK-JET RECORDING METHOD USING THE SAME

(75) Inventor: Makoto Ohmoto, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 372 days.

(21) Appl. No.: 13/041,923

(22) Filed: Mar. 7, 2011

(65) Prior Publication Data

US 2011/0216119 A1 Sep. 8, 2011

(30) Foreign Application Priority Data

Mar. 8, 2010 (JP) ................................. 2010-050975

(51) Int. Cl.
*B41J 2/01* (2006.01)

(52) U.S. Cl.
USPC ............................................ 347/100; 347/95

(58) Field of Classification Search
USPC ......... 347/100, 95, 96, 101, 88, 99, 21, 20, 9; 106/31.6, 31.13, 31.27; 523/160, 161
See application file for complete search history.

(56) References Cited

U.S. PATENT DOCUMENTS

| 5,766,325 | A | * | 6/1998 | Gundlach et al. | 347/100 |
| 2004/0232262 | A1 | * | 11/2004 | Itoh et al. | 241/1 |
| 2007/0040881 | A1 | * | 2/2007 | Ham et al. | 347/100 |
| 2011/0025753 | A1 | * | 2/2011 | Yanagi et al. | 347/105 |

FOREIGN PATENT DOCUMENTS

| JP | 8-120204 A | 5/1996 |
| JP | 08-333533 A | 12/1996 |
| JP | 10-315474 A | 12/1998 |
| JP | 2003-285532 A | 10/2003 |

OTHER PUBLICATIONS

Japanese Office Action dated Nov. 5, 2013 for corresponding Japanese Patent Application No. 2010-050975.

* cited by examiner

*Primary Examiner* — Manish S Shah
(74) *Attorney, Agent, or Firm* — Sughrue Mion, PLLC

(57) ABSTRACT

An ink jet pigment ink having at least one low-molecular compound represented by specific formulae and a polymer having at least one polyethylene oxide block structure, wherein a viscosity of the ink-jet pigment ink at 65° C. increases to 100 mPa·s or more in response to heating.

9 Claims, No Drawings

INK-JET PIGMENT INK AND INK-JET RECORDING METHOD USING THE SAME

FIELD OF THE INVENTION

The present invention relates to an ink-jet pigment ink, an ink jet recording method using the same, a printed matter and an ink-jet recording apparatus.

BACKGROUND OF THE INVENTION

The ink-jet recording has such a lot of advantages that a high-speed recording is possible; a low noise level is achieved; colorization is easy; a high resolution can be made; and a plain paper recording is possible. Because of these advantages, instruments and equipments using such recording method are remarkably in widespread use. As the ink used in this recording method, an aqueous ink is dominant from the viewpoints of safety, odor and the like. In the ink-jet recording method, image formation is performed by ejecting (discharging) the ink in a rate of several thousands or more drops per second.

In the case where a high-speed printing is performed by the ink-jet recording method, aggregation and color bleeding may occur. Specifically, the term "aggregation" signifies a phenomenon in which before absorption of the first ink droplet into a paper has been completed, the second ink droplet reaches to the first ink droplet and they are united or aggregated to form one large liquid droplet. The image resolution is deteriorated by the aggregation. On the other hand, the term "color bleeding" signifies a phenomenon in which image sharpness and color quality are deteriorated on the grounds that two droplets, which are to be united, contain a colorant having a different color from each other.

As a method contemplated to address the problem of color bleeding in a high-speed printing, a method of using an ink that turns into a gel in response to heat, and printing the ink on a recording element (paper) having been heated at a higher temperature than that of the ink is proposed (see JP-A-2003-285532 ("JP-A" means unexamined published Japanese patent application)).

Other than the color bleeding, various kinds of properties such that clogging in a recording apparatus is not caused; intermittent ejection stability is secured; and the like are demanded for the ink jet ink. One example of the inks by which such properties have been improved is an ink containing urea, which is described in JP-A-8-120204.

In the mean time, improvement of bleeding and suppression of penetration of the ink through the paper (transfer of the ink to the back side of the paper) have been further strongly required for the ink-jet recording pigment ink. The present inventors have confirmed that although the color bleeding is improved by a technique described in JP-A-2003-285532, the effect of improvement is not enough. Further, sometimes, a density on the printing side becomes low due to penetration of the ink through the paper whereby it becomes difficult to obtain a necessary optical density (OD). In addition, improvement of ejectability (ejection property), especially improvement relating to a delay of ejection is desired. Further, the printing method described in JP-A-2003-285532 needs to heat a recording element; and in Examples thereof, printing is carried out by heating to 85° C. Therefore, it is also desired to lower the heating temperature thereby reducing the load on a recording apparatus or a recording system as well as energy consumption.

SUMMARY OF THE INVENTION

The present invention resides in an ink-jet pigment ink, comprising:

at least one low-molecular compound represented by the following formula (1-1) or formula (2-1):

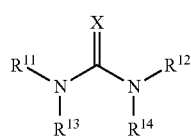

Formula (1-1)

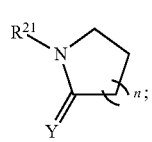

Formula (2-1)

and a polymer having at least one polyethylene oxide block structure, wherein a viscosity of the ink-jet pigment ink at 65° C. increases to 100 mPa·s or more in response to heating, wherein, in formula (1-1), $R^{11}$, $R^{12}$, $R^{13}$ and $R^{14}$ each independently represent a hydrogen atom or an alkyl group having 1 to 4 carbon atoms; $R^{13}$ and $R^{14}$ may be bonded to each other to form a ring; and X represents an oxygen atom or a sulfur atom, and wherein, in formula (1-2), $R^{21}$ represents a hydrogen atom or an alkyl group having 1 to 4 carbon atoms; Y represents an oxygen atom or a sulfur atom; and n represents an integer of 1 to 3.

Further, the present invention resides in ink jet recording method, comprising the step of: printing on a recording sheet by ejecting ink droplets from an orifice of a recording head in response to recording signals, wherein the ink is the ink jet pigment ink described in the above item, and wherein the recording sheet is heated to 65° C. or higher before the ink droplets land, or at the time of landing.

Further, the present invention resides in a printed matter comprising a recording sheet having been printed thereon by the ink-jet recording method described in the above item.

Further, the present invention resides in an ink jet recording apparatus, comprising: a recording unit, wherein the recording unit is equipped with an ink-containing section that contains an ink and a head section that ejects the ink in the form of liquid droplets, wherein the ink is the ink jet pigment ink described in the above item, and wherein the ink-jet recording apparatus further comprises a heating and retaining means that maintains the temperature of a recording sheet at 65° C. or higher by heating before the ink droplets land, or at the time of landing.

Other and further features and advantages of the invention will appear more fully from the following description.

DETAILED DESCRIPTION OF THE INVENTION

According to the present invention, there are provided the following means:

(1) An ink-jet pigment ink, comprising:
at least one low-molecular compound represented by the following formula (1-1) or formula (2-1):

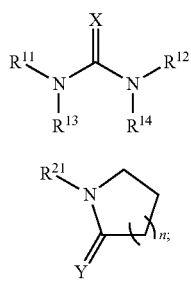

Formula (1-1)

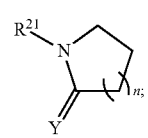

Formula (2-1)

and a polymer having at least one polyethylene oxide block structure, wherein a viscosity of the ink-jet pigment ink at 65° C. increases to 100 mPa·s or more in response to heating, wherein, in formula (1-1), $R^{11}$, $R^{12}$, $R^{13}$ and $R^{14}$ each independently represent a hydrogen atom or an alkyl group having 1 to 4 carbon atoms; $R^{13}$ and $R^{14}$ may be bonded to each other to form a ring; and X represents an oxygen atom or a sulfur atom, and wherein, in formula (1-2), $R^{21}$ represents a hydrogen atom or an alkyl group having 1 to 4 carbon atoms; Y represents an oxygen atom or a sulfur atom; and n represents an integer of 1 to 3.

(2) The ink-jet pigment ink described in the above item (1), wherein the low-molecular compound is represented by the following formula (1-2) or formula (2-2):

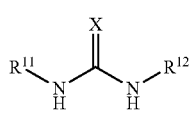

Formula (1-2)

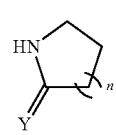

Formula (2-2)

wherein, in formula (1-2), $R^{11}$ and $R^{12}$ each independently represent a hydrogen atom or an alkyl group having 1 to 4 carbon atoms; and X represents an oxygen atom or a sulfur atom; and wherein, in formula (2-2), Y represents an oxygen atom or a sulfur atom; and n represents an integer of 1 to 3.

(3) The ink-jet pigment ink described in the above item (2), wherein the low-molecular compound is represented by the following formula (1-3) or formula (2-3):

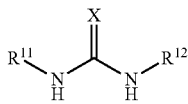

Formula (1-3)

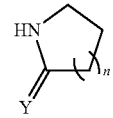

Formula (2-3)

wherein, in formula (1-3), $R^{11}$ and $R^{12}$ each independently represent a hydrogen atom or an alkyl group having 1 to 4 carbon atoms; and wherein, in formula (2-3), n represents an integer of 1 to 3.

(4) The ink jet pigment ink described in the above item (3), wherein the low-molecular compound is at least one kind selected from the group consisting of urea and 2-pyrrolidone.

(5) The ink jet pigment ink described in any one of the above items (1) to (4), wherein a content of the low-molecular compound is more than 7% by mass with respect to the total amount of the ink-jet pigment ink.

(6) The ink-jet pigment ink described in any one of the above items (1) to (5), wherein the polymer having at least one polyethylene oxide block structure is a tri-block polymer of polyethylene oxide-polypropylene oxide-polyethylene oxide.

(7) An ink-jet recording method, comprising the step of:
printing on a recording sheet by ejecting ink droplets from an orifice of a recording head in response to recording signals,
wherein the ink is the ink jet pigment ink described in any one of the above items (1) to (6), and
wherein the recording sheet is heated to 65° C. or higher before the ink droplets land, or at the time of landing.

(8) A printed matter comprising a recording sheet having been printed thereon by the ink-jet recording method described in the above item (7).

(9) An ink-jet recording apparatus, comprising: a recording unit,
wherein the recording unit is equipped with an ink-containing section that contains an ink and a head section that ejects the ink in the form of liquid droplets,
wherein the ink is the ink-jet pigment ink described in any one of the above items (1) to (6), and
wherein the ink jet recording apparatus further comprises a heating and retaining means that maintains the temperature of a recording sheet at 65° C. or higher by heating before the ink droplets land, or at the time of landing.

Hereinafter, the ink-jet pigment ink (hereinafter referred to simply as "ink") of the present invention will be described.

The ink of the present invention has a property of thickening (increasing of viscosity) in response to heating. The viscosity at 65° C. is 100 mPa·s or more, and preferably 150 mPa·s or more. The upper limit of the viscosity at 65° C. is not particularly restricted. A relatively higher viscosity is preferred. However, the viscosity is ordinarily 10,000 mPa·s or less. Further, from the viewpoint of controlling ejectability, the viscosity at 30° C. is preferably 1 to 20 mPa·s, and more preferably 3 to 12 mPa·s. In addition, a measuring method of the viscosity in the present invention is as follows.

(Measuring Method of Viscosity)

Unless otherwise indicated, the viscosity in the present invention refers to an average of the values obtained by measuring a viscosity five times every 100 seconds after the test sample has been adjusted to a predetermined temperature using a temperature-variable type rotational viscometer Physica MCR301 (trade name, manufactured by Anton Paar GmbH). It can be assumed that the viscosity obtained by the above measurement is also achieved on a recording sheet having been heated according to the recording method of the present invention described below. As the measuring conditions, shear rate of 10 (1/s) and rate of temperature rise of 5° C./5 seconds are used.

The thickening behavior of the ink is assumed as follows. When the polymer having at least one polyethylene oxide block structure is dissolved in a medium by hydration, the polymer dehydrates by heating. As a result, polyethylene oxide blocks of the polymer interact with each other whereby the ink turns into a gel, resulting in thickening. On the other hand, in the present invention, it is possible to effectively thicken the ink at a relatively lower temperature by additionally containing a low-molecular compound represented by formula (1-1) or formula (2-1). It is assumed that the low-molecular compound has a hydrogen-bonding property whereby dehydration of the above-described polyethylene oxide blocks of the polymer is accelerated.

According to the ink of the present invention, it is possible to suppress both aggregation and color bleeding of the ink droplets in a high-speed printing because the ink of the present invention has the above properties. Further, the ink of the present invention makes it possible to suppress both dot bleeding and penetration of the ink through the paper while holding the above-described suppression effects of aggregation and color bleeding. In addition, these effects can be obtained while holding down the heating temperature of the recording sheet at the time of printing.

Further, in the case of forming dots with such high-temperature-induced gelation ink according to the ink-jet recording method, a solvent evaporates after increase of viscosity due to gel transition. As a result, the cross-sectional shape of the dot forms a trapezoid or concave. From the viewpoint of density uniformity, a trapezoid is preferred. In the ink of the present invention, the shape of the dots to be formed is excellent whereby print qualities are also improved.

The composition of the ink according to the present invention will be described below.

[Polymer Having at Least One Polyethylene Oxide Block Structure]

The ink of the present invention comprises at least one polymer including at least one polyethylene oxide (PEO) block structure. Specific examples of the polymer include polyethylene oxide, di-block polymer of polyethylene oxide-polypropylene oxide (PEO-PPO), di-block polymer of polyethylene oxide-polycaprolactone, di-block polymer of polyethylene oxide-polylactide, and tri-block copolymer of polyethylene oxide-poly propylene oxide-polyethylene oxide (PEO-PPO-PEO). It is especially preferred to use an aqueous solution of the tri-block copolymer of PEO-PPO-PEO. The copolymerization ratio is preferably in the range of from 10 to 100% by mass, more preferably from 40 to 100% by mass, and especially preferably from 60 to 90% by mass, in terms of the percentage by mass of PEO contained in the above-described polymer. The allocation of PEO allocated to both sides of the PPO block is not particularly limited. However, the allocation is preferably in the range of from 1:99 to 50:50, more preferably from 10:90 to 50:50, and still more preferably from 20:80 to 50:50.

The molecular weight of the above polymer is preferably from 1,000 to 100,000, more preferably from 8,000 to 30,000. When described simply as a molecular weight in the present invention, the molecular weight means a number average molecular weight unless otherwise specified, and the molecular weight is a value measured by the following measuring method. In addition, when the polymer used in the present invention should be distinguished from a low-molecular compound, a compound having the molecular weight of from 1 to 999 is defined as the low-molecular compound.

(Measuring Method of Molecular Weight)

The molecular weight is measured using GPC (gel pen permeation chromatography) method, unless otherwise specified. The gel packed in the column used for GPC method is preferably a gel having an aromatic compound in the repeating unit, and examples thereof include a gel comprising a styrene-divinylbenzene copolymer. Two to six columns are preferably connected and used. The solvent used includes an ether-based solvent such as tetrahydrofuran, and an amide-based solvent such as N-methylpyrrolidinone, and an ether-based solvent such as tetrahydrofuran is preferred. The measurement is preferably performed at a solvent flow rate of 0.1 to 2 mL/min, most preferably from 0.5 to 1.5 mL/min. When the measurement is performed in this range, the measurement can be performed more efficiently without imposing a load on the apparatus. The measurement temperature is preferably from 10 to 50° C., and most preferably from 20 to 40° C.

The specific conditions for the measurement of molecular weight are shown below.

Apparatus: HLC-8220GPC (manufactured by TOSOH CORPORATION)

Detector: Differential refractometer (RI detector)

Precolumn: TSK GUARD COLUMN MP (XL), 6 mm×40 mm (manufactured by TOSOH CORPORATION)

Sample-side column: Two of the following column were directly connected (all manufactured by TOSOH CORPORATION).

TSK-GEL Multipore-HXL-M 7.8 mm×300 mm

Reference-side column: Same as the sample-side column

Thermostatic bath temperature: 40° C.

Moving phase: Tetrahydrofuran

Flow rate of sample-side moving phase~1.0 mL/min

Flow rate of reference-side moving phase: 0.3 mL/min

Sample concentration: 0.1 wt %

Amount of sample injected: 100

Data sampling time: 16 to 46 minutes after sample injection

Sampling pitch: 300 msec

Examples of the tri-block copolymer of PEO-PPO-PEO that may be preferably used include commercially available products marketed as NEWPOL PE-78 (trade name, manufactured by Sanyo Chemical Industries, Ltd.), PLURONIC P85 (trade name, manufactured by BASF Corporation), NEWPOL PE-62 (trade name, manufactured by Sanyo Chemical Industries, Ltd.), NEWPOL PE-64 (trade name, manufactured by Sanyo Chemical Industries, Ltd.), NEWPOL PE-68 (trade name, manufactured by Sanyo Chemical Industries, Ltd.), NEWPOL PE-74 (trade name, manufactured by Sanyo Chemical Industries, Ltd.), NEWPOL PE-75 (trade name, manufactured by Sanyo Chemical Industries, Ltd.), NEWPOL PE-108 (trade name, manufactured by Sanyo Chemical Industries, Ltd.), NEWPOL PE-128 (trade name, manufactured by Sanyo Chemical Industries, Ltd.), PLURONIC L62 (trade name, manufactured by BASF Corporation), PLURONIC F87 (trade name, manufactured by BASF Corporation), and polyethylene glycol-block polypropylene glycol-block polyethylene glycol (manufactured by Aldrich Corporation).

The content of the polymer in the ink is preferably 2 to 30% by mass, and more preferably 5 to 15% by mass. The thickening property of the ink in response to heat is adjusted so that the ink shows the above-described behavior.

[Low-Molecular Compound]

The ink of the present invention contains at least one kind of the compound represented by the following formula (1-1) or formula (2-1). The ink may contain at least two kinds of these compounds.

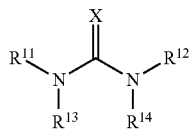

Formula (1-1)

wherein $R^{11}$, $R^{12}$, $R^{13}$ and $R^{14}$ each independently represent a hydrogen atom or an alkyl group having 1 to 4 carbon atoms; $R^{13}$ and $R^{14}$ may be bonded to each other to form a ring; X represents an oxygen atom or a sulfur atom.

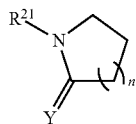

Formula (2-1)

wherein $R^{21}$ represents a hydrogen atom or an alkyl group having 1 to 4 carbon atoms; Y represents an oxygen atom or a sulfur atom; n represents an integer of 1 to 3.

In formula (1-1), specific examples of $R^{11}$, $R^{12}$, $R^{13}$ and $R^{14}$ include a hydrogen atom, a methyl group, an ethyl group, a propyl group and a butyl group. Each of $R^{11}$, $R^{12}$, $R^{13}$ and $R^{14}$ is preferably a hydrogen atom, a methyl group, an ethyl group or a propyl group; more preferably a hydrogen atom or a methyl group.

In formula (1-1), $R^{13}$ and $R^{14}$ may be bonded to each other to form a ring. Specific examples of an alkylene group, which is formed by bonding, include an ethylene group, a propylene group and a butylene group. The alkylene group is preferably an ethylene group or a propylene group.

In formula (2-1), Y is preferably an oxygen atom.

In formula (2-1), specific examples of $R^{21}$ include a hydrogen atom, a methyl group, an ethyl group, a propyl group and a butyl group. $R^{21}$ is preferably a hydrogen atom, a methyl group, an ethyl group or a propyl group; more preferably a hydrogen atom or a methyl group.

In formula (2-1), n is preferably an integer of 1 to 2, and more preferably 1.

Further, the compound represented by formula (1-1) or formula (2-1) is preferably the compound represented by formula (1-2) or (2-2), respectively.

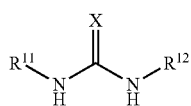

Formula (1-2)

wherein $R^{11}$, $R^{12}$ and X have the same meanings as $R^{11}$, $R^{12}$ and X in formula (1-1), respectively; and the specific examples and favorable ranges thereof are also the same as those in formula (1-1).

Formula (2-2)

wherein Y and n have the same meanings as Y and n in formula (2-1), respectively, and the specific examples and favorable ranges thereof are also the same as those in formula (2-1).

More preferable compound represented by formula (1-2) or formula (2-2) is represented by the following formula (1-3) or formula (2-3), respectively.

Formula (1-3)

wherein $R^{11}$ and $R^{12}$ have the same meanings as $R^{11}$ and $R^{12}$ in formula (1-1), respectively, and the specific examples and favorable ranges thereof are also the same as those in formula (1-1).

Formula (2-3)

wherein n has the same meaning as n in formula (2-1), and the specific examples and favorable range thereof are also the same as those in formula (2-1).

Specific preferable examples of the compound represented by formulae (1-1) to (1-3) include urea, thiourea, N-methylurea, N,N-dimethylurea, N,N'-dimethylurea, N-methylthiourea, N,N-dimethylthiourea, and N,N'-dimethylthiourea. Among them, urea, thiourea, N-methylurea, N,N-dimethylurea, N,N'-dimethylurea are more preferable; and urea is particularly preferable.

Specific preferable examples of the compound represented by formulae (2-1) to (2-3) include 2-pyrrolidone and N-methylpyrrolidone. Among them, 2-pyrrolidone is more preferable.

As the addition amount of the low-molecular compound, it is preferred to add the low-molecular compound to the ink in an amount of more than 7% by mass, more preferably more than 7% by mass and 40% by mass or less, and still more preferably more than 7% by mass and 25% by mass or less. If the addition amount is too small, the thickening effect due to addition of the low-molecular compound may not be obtained sufficiently. On the other hand, if the addition amount is too large, the ink viscosity at room temperature increases, so that ejection may become difficult.

In addition, the addition amount of the low-molecular compound is adjusted so that the thickening behavior of the ink becomes as described above. Further, the addition amount of the low-molecular compound is preferably in the range of from 0.23 to 40% by mass in terms of the ratio by mass of the low-molecular compound with respect to the above-described polymer having at least one polyethylene oxide block structure.

[Pigment]

The ink of the present invention contains a pigment. As the pigment in the present invention, any known pigment can be used without any particular restriction. Above all, a pigment that is substantially insoluble or sparingly soluble in water is preferred from the standpoint of ink coloring properties. In the present invention, a water-insoluble pigment itself or a pigment itself surface-treated with a dispersant can be used as the pigment (colorant).

The pigment that may be used in the present invention is not particularly limited in its kind, and any one of the conventional organic and inorganic pigments may be used. Examples of the pigment that may be used include polycyclic pigments such as azo lake, azo pigment, phthalocyanine pigment, perylene and perynone pigments, anthraquinone pigment, quinacridone pigment, dioxadine pigment, diketopyrrolopyrrole pigment, thioindigo pigment, isoindolinone pigment and quinophthalone pigment; dye lakes such as basic dye type lake and acidic dye type lake; organic pigments such as nitro pigment, nitroso pigment, aniline black and daylight fluorescent pigment; and inorganic pigments such as titanium oxide, iron oxide type and carbon black type. Even pigments that are not described in Color Index can be used so long as they are pigments capable of being dispersed in an aqueous phase. Furthermore, those obtained by surface-treating the above-described pigments with a surfactant, a polymeric dispersant or the like, and grafted carbon can also be used. Of the above pigments, azo pigment, phthalocyanine pigment, anthraquinone pigment, quinacridone pigment and carbon black type pigment are preferably used.

Specific examples of the organic pigment used in the present invention are described below.

Examples of the organic pigment for orange or yellow include C.I. Pigment Orange 31, C.I. Pigment Orange 43, C.I. Pigment Yellow 12, C.I. Pigment Yellow 13, C.I. Pigment Yellow 14, C.I. Pigment Yellow 15, C.I. Pigment Yellow 17, C.I. Pigment Yellow 74, C.I. Pigment Yellow 93, C.I. Pigment Yellow 94, C.I. Pigment Yellow 128, C.I. Pigment Yellow 138, C.I. Pigment Yellow 151, C.I. Pigment Yellow 155, C.I. Pigment Yellow 180 and C.I. Pigment Yellow 185.

Examples of the organic pigment for magenta or red include C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 177, C.I. Pigment Red 178, C.I. Pigment Red 222 and C.I. Pigment Violet 19.

Examples of the organic pigment for green or cyan include C.I. Pigment Blue 15, C.I. Pigment Blue 15:2, C.I. Pigment Blue 15:3, C.I. Pigment Blue 15:4, C.I. Pigment Blue 16, C.I. Pigment Blue 60, C.I. Pigment Green 7, and siloxane-crosslinked aluminum phthalocyanine described in U.S. Pat. No. 4,311,775.

Examples of the organic pigment for black include C.I. Pigment Black 1, C.I. Pigment Black 6 and C.I. Pigment Black 7.

The average particle diameter of the pigment is preferably from 10 to 200 nm, more preferably from 10 to 150 nm, and further preferably from 10 to 100 nm. When the average particle diameter is 200 nm or less, favorable color reproducibility and dotting properties upon dotting by an inkjet method can be achieved. When the average diameter is 10 nm or more, favorable light fastness can be achieved. The particle size distribution of the pigment is not particularly limited, and the pigment may have a wide range of particle size distribution or a monodispersible particle size distribution. Further, two or more kinds of pigment each having a monodispersible particle size distribution may be used in combination.

The average particle diameter and the particle size distribution of the pigment can be obtained by measuring the volume-average particle diameter of the pigment by a dynamic light scattering method, using a NANOTRACK particle size distribution analyzer (UPA-EX150, trade name, manufactured by Nikkiso Co., Ltd.).

The pigment may be used alone or in combination of two or more kinds. From the viewpoint of image density, the content of pigment in the ink is preferably from 1% by mass to 25% by mass, more preferably from 2% by mass to 20% by mass, still more preferably from 5% by mass to 20% by mass, and particularly preferably from 5% by mass to 15% by mass, with respect to the total amount of the ink composition.

[Dispersant and Dispersing Medium]

Ordinarily the dispersant is a material to be added for the purpose of dispersing a pigment, and the dispersing medium (binder) is a material to be added for the purpose of improving scratch resistance, solvent resistance, water resistance, and the like.

However, in the present invention, a material that is described bellow as the dispersant may be added as a dispersing medium. Accordingly, the dispersant and the dispersing medium are collectively explained below as a dispersant.

The pigment according to the present invention is preferably dispersed in an aqueous solvent by a dispersant. The dispersant may be a polymer dispersant, or a surfactant type dispersant. The polymer dispersant may be either one of a water-soluble dispersant or a water-insoluble dispersant.

The above surfactant type dispersant can be added for the purpose of dispersing an organic pigment stably in an aqueous medium while maintaining the viscosity of the ink at a low level. The surfactant-type dispersant referred to herein is a dispersant of which molecular weight is smaller than that of the polymer dispersant, and the surfactant-type dispersant has a mass average molecular weight of 2,000 or less. The molecular weight of the surfactant-type dispersant is preferably from 100 to 2,000, and more preferably from 200 to 2,000.

As the water-soluble dispersant among the polymer dispersant in the present invention, a hydrophilic polymer compound can be used. Examples of natural hydrophilic polymer compounds include plant polymers such as gum arabic, gum tragacanth, guar gum, gum karaya, locust bean gum, arabinogalactan, pectin and quince seed starch, algae polymers such as alginic acid, carrageenan and agar, animal polymers such as gelatin, casein, albumin and collagen, and microbial polymers such as xanthene gum and dextran.

Examples of hydrophilic polymer compounds obtained by chemically modifying natural raw materials include cellulose polymers such as methyl cellulose, ethyl cellulose, hydroxyethyl cellulose, hydroxypropyl cellulose and carboxymethyl cellulose, starch polymers such as sodium starch glycolate, and sodium starch phosphate, and algae polymers such as propylene glycol alginate.

Examples of synthetic water-soluble polymer compounds include vinyl polymers such as polyvinyl alcohol, polyvinyl pyrrolidone and polyvinyl methyl ether; acrylic resins such as polyacrylamide, polyacrylic acid and alkali metal salts thereof, or water-soluble styrene acrylic resin; water-soluble styrene maleic acid resin; water-soluble vinylnaphthalene acrylic resin; water-soluble vinylnaphthalene maleic acid resins; polyvinyl pyrrolidone; polyvinyl alcohol; alkali metal salts of formalin condensates of β-naphthalene sulfonic acid;

polymer compounds having, at a side chain, a salt of a cationic functional group such as a quaternary ammonium group or an amino group.

Among these, a polymer compound containing a carboxyl group or a sulfonyl group is preferable from the viewpoint of dispersion stability of pigment. Polymer compounds containing a carboxyl group such as the following are particularly preferable: (meth)acrylic resins such as styrene-(meth)acrylic resins; styrene maleic acid resins; vinylnaphthalene acrylic resins; vinylnaphthalene maleic acid resins, polyvinylbenzenesulfonate resins, polystyrene-vinylbenzenesulfonate resins, and styrene-vinylsulfonate resins.

The mass average molecular weight of the polymer dispersant in the present invention is preferably from 3,000 to 200,000, more preferably from 5,000 to 100,000, further preferably from 5,000 to 80,000, and still further preferably from 10,000 to 60,000.

The ratio of an amount of the pigment to an amount of the dispersant (pigment: dispersant) in the ink composition in terms of mass is preferably in the range of from 1:0.06 to 1:3, more preferably in the range of from 1:0.125 to 1:2, and still more preferably in the range of from 1:0.125 to 1:1.5.

[Solvent]

The ink of the present invention is an aqueous ink. As the solvent, water, more preferably ion-exchanged water is used. Any other organic solvent may be contained for the purpose of suppressing drying, accelerating penetration, regulating viscosity, and the like.

A certain organic solvent used as an anti-drying agent can effectively prevent nozzle clogging, which could otherwise be caused by the ink dried in the ink ejecting port in the process of ejecting the ink composition by ink-jet method for image recording.

For the suppression of drying, a hydrophilic organic solvent having a vapor pressure lower than that of water is preferably used. Specific examples of the hydrophilic organic solvent suitable for the suppression of drying include: polyhydric alcohols such as ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin, and trimethylolpropane; heterocyclic compounds such as 2-pyrrolidone, N-methyl-2-pyrrolidone, 1,3-dimethyl-2-imidazolidinone, and N-ethylmorpholine; sulfur-containing compounds such as sulfolane, dimethylsulfoxide and 3-sulfolene; polyfunctional compounds such as diacetone alcohol and diethanolamine; and urea derivatives. Among these, polyhydric alcohols such as glycerin and diethylene glycol are preferred.

In order to accelerate the penetration, an organic solvent may be used for better penetration of the ink composition into a recording media. Examples of the organic solvent suitable for accelerating the penetration include alcohols such as ethanol, isopropanol, butanol, and 1,2-hexanediol, sodium lauryl sulfate, sodium oleate, and nonionic surfactants.

In addition to the above purposes, the hydrophilic organic solvent may also be used to control viscosity. Specific examples of the hydrophilic organic solvent that may be used to control viscosity include alcohols (e.g., methanol, ethanol and propanol), amines (e.g., ethanolamine, diethanolamine, triethanolamine, ethylenediamine, and diethylenetriamine), and other polar solvents (e.g., formamide, N,N-dimethylformamide, N,N-dimethylacetamide, dimethylsulfoxide, sulfolane, 2-pyrrolidone, acetonitrile, and acetone).

The content of the organic solvent is preferably from 0% by mass to 80% by mass, more preferably from 0% by mass to 60% by mass, and still more preferably from 0% by mass to 50% by mass with respect to the total amount of the ink.

[Water]

The ink used in the present invention contains water. There is no particular limitation to the content of water in the ink. The content of water may be from 10% by mass to 99% by mass, more preferably from 30% by mass to 80% by mass, and still more preferably 50% by mass to 70% by mass with respect to the total amount of the ink.

[Other Additives]

The ink composition of the invention may further contain other additives in accordance with necessity. Examples of such other additives include known additives such as a color fading inhibitor, an emulsion stabilizer, a permeation accelerator, an ultraviolet absorbent, a preservative, a mildew-proofing agent, a pH regulator, a surface tension regulator, a defoaming agent, a viscosity-adjusting agent, a dispersant, a dispersion stabilizer, an anti-rust agent and a chelating agent. These various additives may directly be added after preparation of the ink composition, or may be added at the time of preparation of the ink composition.

[Ultraviolet Absorbent]

The ultraviolet absorbent is used for the purpose of improving preservability of an image. As the ultraviolet absorbent, the following compounds can be used; benzotriazole compounds described in, for example, JP-A-58-185677, JP-A-61-190537, JP-A-2-782, JP-A-5-197075 and JP-A-9-34057; benzophenone compounds described in, for example, JP-A-46-2784 and JP-A-5-194483, and U.S. Pat. No. 3,214,463; cinnamic acid compounds described in, for example, JP-B-48-30492 ("JP-B" means examined Japanese patent publication) and JP-B-56-21141, and JP-A-10-88106; triazine compounds described in, for example, JP-A-4-298503, JP-A-8-53427, JP-A-8-239368 and JP-A-10-182621, and JP-T-8-501291 ("JP-T" means published Japanese translation of PCT application); compounds described in Research Disclosure No. 24239; and compounds that absorb ultraviolet light and emit fluorescence, i.e., fluorescent brighteners, typified by stilbene compounds or benzoxazole compounds.

[Color Fading Inhibitor]

The color fading inhibitor is used for the purpose of improving storability of an image. Examples of the color fading inhibitor that can be used include various organic color fading inhibitors and metal complex color fading inhibitors. Examples of the organic color fading inhibitor include hydroquinones, alkoxyphenols, dialkoxyphenols, phenols, anilines, amines, indanes, chromanes, alkoxyanilines and heterocycles. Examples of the metal complex color fading inhibitor include a nickel complex and a zinc complex. More specifically, compounds described in the patents cited in Research Disclosure No. 17643, chapter VII, items Ito J; Research Disclosure No. 15162: Research Disclosure No. 18716, page 650, the left-hand column; Research Disclosure No. 36544, page 527; Research Disclosure No. 307105, page 872; and Research Disclosure No. 15162, and compounds included in the formulae of the representative compounds and the exemplified compounds described on pages 127 to 137 of JP-A-62-215272 can be used.

[Mildew-Proofing Agent]

Examples of the mildew-proofing agent include sodium dehydroacetate, sodium benzoate, sodium pyridinethion-1-oxide, p-hydroxybenzoic acid ethyl ester, 1,2-benzisothiazolin-3-one and its salt. These are preferably used in the ink composition in an amount of from 0.02 to 1.00% by mass.

[pH Regulator]

As the pH regulator, a neutralizer (organic base and inorganic alkali) may be used. The pH regulator may be added in an amount such that the ink composition has pH of preferably from 6 to 10, and more preferably from 7 to 10, from the view point of improving storage stability of the ink composition.

[Surface Tension Regulator]

Examples of the surface tension regulator include nonionic surfactants, cationic surfactants, anionic surfactants, and betaine type surfactants.

For smooth ejection in the ink-jet recording method, the amount of addition of the surface tension regulator is preferably such that the surface tension of the ink composition can be adjusted in the range of from 20 mN/m to 60 mN/m, more preferably from 20 mN/m to 45 mN/m, further preferably from 25 mN/m to 40 mN/m. When the ink is applied by methods other than ink-jet methods, the amount of addition of the surface tension regulator is preferably such that the surface tension of the ink composition can be adjusted in the range of from 20 mN/m to 60 mN/m, more preferably from 30 mN/m to 50 mN/m.

The surface tension of the ink composition may be measured by a plate method using Automatic Surface Tensiometer CBVP-Z (trade name, manufactured by Kyowa Interface Science Co., LTD.) under the temperature condition of 25° C.

[Surfactant]

Specific examples of the hydrocarbon-series surfactant include anionic surfactants such as fatty acid salts, alkyl sulfate ester salts, alkyl benzenesulfonates, alkyl naphthalenesulfonates, dialkyl sulfosuccinates, alkyl phosphate ester salts, naphthalenesulfonic acid-formalin condensates, and polyoxyethylene alkyl sulfate ester salts; and nonionic surfactants such as polyoxyethylene alkyl ethers, polyoxyethylene alkyl allyl ethers, polyoxyethylene fatty acid esters, sorbitan fatty acid esters, polyoxyethylene sorbitan fatty acid esters, polyoxyethylene alkylamines, glycerin fatty acid esters, and oxyethylene-oxypropylene block copolymers. Acetylene polyoxyethylene oxide surfactants SURFYNOLs (trade name, manufactured by Air Products & Chemicals, Inc.) are also preferably used. Amine oxide type amphoteric surfactants such as N,N-dimethyl-N-alkylamine oxide are also preferable.

The surfactants listed in pages 37 to 38 of JP-A-59-157636 and Research Disclosure No. 308119 (1989) may also be used.

Fluorocarbon (alkyl fluoride type) surfactants or silicone surfactants as described in JP-A-2003-322926, JP-A-2004-325707 and JP-A-2004-309806 may be used to improve a scratch resistance.

The surface tension regulator may also be used as a defoaming agent, and fluorine-series compounds, silicone-series compounds, and chelating agents as typified by EDTA may also be used.

In the ink of the present invention, a thickener, a conductivity improver, a kogation inhibitor ("kogation" means solid deposits baked onto the surface of a heater), a desiccant, a water-resistant ruggedization agent, a light stabilizer, a buffering agent, an anti-curling agent, or the like further may be added. Examples of the buffering agent include sodium borate, sodium hydrogenphosphate, sodium dihydrogenphosphate, and a mixture thereof. However, the buffering agent is not limited thereto.

Next, the ink jet recording method, ink jet recording apparatus and printed matter of the present invention will be described.

[Ink-jet Recording Method]

The ink-jet recording method is a method to form images by ejecting ink droplets from a plurality of nozzles or orifices built in a printer head of an ink-jet printer, and allowing the ink droplets to land on a recording sheet while controlling the ink droplets by the ejection. This method is roughly classified into a method of ejecting liquid droplets by applying a mechanical energy to the liquid droplets and a method of ejecting liquid droplets by bubble release resulting from application of heat energy to the liquid droplets. In the present invention, any one of these methods may be used.

The printing speed is not particularly limited. However, since the present invention makes it possible to obtain excellent images even in a high-speed printing, the range of from 50 m/min to 200 m/min is preferred. Though the liquid amount per droplet is not particularly limited, the range of from 2 to 15 pl is preferred.

In the ink jet recording method of the present invention, the above-described ink of the present invention is used. In the case of color printing, it is sufficient that at least one of the inks used in the ink set is the ink of the present invention. In addition, the ink-jet recording method of the present invention is characterized in that the recording sheet is heated to 65° C. or higher before the ink droplets land, or at the time of landing, preferably in the range of from 65° C. to 100° C., more preferably in the range of from 65° C. to 90° C., and still more preferably in the range of from 65° C. to 80° C. This temperature is defined as a value obtained by measuring a temperature at the side of the ink-jet recording (the side at which ink droplets land) of the recording sheet using a non-contact thermometer such as an infrared thermometer (for example, IR-66B (trade name), manufactured by MK Scientific, Inc.). The measuring position is set between a head section of the ink-jet recording apparatus and a means (unit) that heats a recording sheet. If the heating temperature is too low, the ink may not sufficiently thicken. Further, in order to heat to a higher temperature than the above-described temperature, extra heat sources are needed. As a result, the extra heat sources become a load on the system. In addition, heating may be carried out both before the ink droplets land and at the time of landing. In the method of the present invention, the thickening of the ink on a recording sheet is accelerated by heating on the recording sheet whereby, for example, bleeding can be suppressed.

The recording sheet to be used may be, but not limited to, a sheet of general printing paper (plain paper) containing cellulose as a main component, such as so-called high-quality paper, coated paper, or art paper. When general printing paper containing cellulose as a main component is used in image recording by a conventional ink-jet method with a water-based ink, the ink may be absorbed in the paper and dried relatively slowly, so that colorants in the ink may be likely to migrate after being provided on the paper, which may easily lead to image quality deterioration. According to the ink jet recording method of the invention, however, the migration of the colorants (pigments) may be suppressed so that high-quality image recording with good color density and suppression of penetration of the ink may be achieved.

Generally commercially available recording sheet may be used as the recording sheet, and examples thereof include high-quality paper (A) such as OK PRINCE HIGH-QUALITY (trade name, manufactured by Oji Paper Co., Ltd.), SHIORAI (trade name, manufactured by Nippon Paper Industries Co., Ltd. and NEW NPI HIGH-QUALITY (trade name, manufactured by Nippon Paper Industries Co., Ltd.); lightly coated paper such as OK EVER LIGHT COAT (trade name, manufactured by Oji Paper Co., Ltd.) and AURORA S (trade name, manufactured by Nippon Paper Industries Co., Ltd.); lightweight coated paper (A3) such as OK COAT L (trade name, manufactured by Oji Paper Co., Ltd.) and AURORA L (trade name, manufactured by Nippon Paper Industries Co., Ltd.); coated paper (A2, B2) such as OK TOP COAT+ (trade name, manufactured by Oji Paper Co., Ltd.)

and AURORA Coat (trade name, manufactured by Nippon Paper Industries Co., Ltd.); and art paper (A1) such as OK KANAFUJI+ (trade name, manufactured by Oji Paper Co., Ltd.) and TOKUBISHI ART (trade name, manufactured by Mitsubishi Papers Mills Ltd.).

[Ink-Jet Recording Apparatus]

The ink jet recording apparatus of the present invention is an ink jet recording apparatus equipped with a recording unit including an ink-containing section that contains an ink, and a head section for ejecting the ink in the form of liquid droplets, which is characterized in that the ink is the above-described ink-jet pigment ink of the present invention, and the ink jet recording apparatus further includes a heating and retaining means (hereinafter referred to as "a heating means") that maintains a temperature by heating a recording sheet so that the recording sheet reaches 65° C. or higher, preferably in the range of from 65° C. to 100° C., more preferably in the range of from 65° C. to 90° C., and still more preferably in the range of from 65° C. to 80° C. before the ink droplets land on a recording sheet, or at the time of landing. According to this apparatus, the above-described ink-jet recording method of the present invention can be carried out.

The heat source as a heating means is not particularly limited, as long as a recording sheet is heated by the heat source to a required temperature, so that an ink sufficiently thickens. Specific examples of the heat source include a heat plate, a heat drum, light irradiation, a hot-air source, an electric heater, an infrared lamp, and an infrared laser. If needed, these means may be used in combination. Further, the heating means may be disposed above a recording sheet, or may be below the recording sheet. In addition, a positional relation of the heating means with the head section is arbitrary, as long as a recording sheet is heated by the heating means to a required temperature before the ink droplets land on a recording sheet, or at the time of landing.

The recording unit is not particularly limited, as long as it is a recording unit that is already used in an ordinary ink-jet printer. Examples of the recording unit include the structure described in paragraphs [0061] to [0062] of JP-A-8-333536.

Further, the ink-jet recording apparatus of the present invention preferably has a structure in which a head and a heating unit (heating means) are disposed at a short distance so that ink droplets can land on a recording sheet before a heated recording sheet has gotten chilled. However, if the distance is too short, heat from a heating unit conducts to a head, and the ink thickens in the head, which sometimes results in going into a failure of ejection. Accordingly, it is preferred to assemble the apparatus into a structure in which a head is distatiated from a heating unit enough to meet the requirement that ejectability of the ink in the head is not lost, or a structure in which a head is protected with a heat insulation material in order to block heat from the heating unit.

[Printed Matter]

The printed matter of the present invention is not particularly limited, as long as it is a material in which characters or images are printed on a recording sheet using the above-described ink of the present invention according to an ink-jet recording method of the present invention.

The present invention is contemplated for providing an ink jet pigment ink which exhibits a significant thickening effect whereby both dot bleeding and penetration of the ink through the paper are suppressed, even if printed on a recoding sheet having been heated at a lowered temperature, and which has an excellent ejectability. Further, the present invention is contemplated for providing an ink jet recording method using the above-described pigment ink whereby both penetration of the ink through the paper and a delay of ejection are reduced, even if a heating temperature of the recording sheet is lowered. In addition, the present invention is contemplated for providing an ink-jet recording apparatus by which the above-described ink-jet recording method can be carried out.

The present invention can provide an ink-jet pigment ink which exhibits such excellent function effects that dot bleeding and penetration of the ink through the paper as well as color bleeding at the time of high-speed printing are suppressed, and good ejectability is achieved. As the ink-jet pigment ink of the present invention thickens in response to heat, the above-described effects are obtained by printing while heating a recording sheet. Even if the heating temperature of the recording sheet is lower than that of previous methods, the thickening is effective so that excellent image quality can be obtained. According to both the ink-jet recording method and the ink-jet recording apparatus of the present invention using the above-described ink jet pigment ink, it is possible to form, in high speed, images having such excellent quality that both color bleeding and dot bleeding are suppressed and both penetration of the ink through the paper and a delay of ejection are reduced, even though the heating temperature of the recording sheet is lowered.

The present invention will be described in more detail based on the following examples, but the invention is not intended to be limited thereto. In the following examples, the terms "part(s)" and "%" are values by mass, unless otherwise specified.

EXAMPLES

Example I

Example 1

(Preparation of Black Ink 101)

The following compounds were weighed, mixed and stirred to prepare Black ink 101.

| | |
|---|---|
| Black pigment dispersion (carbon black, water dispersion (15% by mass)) | 26.67 g |
| NEWPOL PE-78(trade name, manufactured by Sanyo Chemical Industries, Ltd.), PEO-PPO-PEO triblock polymer (Mn: 8700, containing PEO by 80% by mass) | 5.0 g |
| Urea (manufactured by Wako Pure Chemical Industries, Ltd.) | 17.2 g |
| Surfactant (Olfine E1010 (trade name, Nissin Chemical Industry Co., Ltd.)) | 1.0 g |
| Ion-exchanged water | 68.33 g |

Example 2

Black ink 102 was prepared in the same manner as Example 1 except that the addition amount of urea was changed to 8.6 g.

Example 3

Black ink 103 was prepared in the same manner as Example 1 except that urea was changed to 2-pyrrolidone.

Example 4

Black ink 104 was prepared in the same manner as Example 1 except that urea was changed to thiourea.

Comparative Example I

Comparative Example 1

Black ink c11 was prepared in the same manner as Example 1 except that urea was not added.

(Evaluation of Viscosity)

Measurement of ink viscosity (mPa·s) at each temperature shown in Table 1 ranging from 25° C. to 90° C. was conducted with respect to Black inks 101 and c11.

The value of viscosity was defined as an average of the values obtained by measuring a viscosity five times every 100 seconds after the test sample has been adjusted to a predetermined temperature shown in Table 1 using a temperature-variable type rotational viscometer Physica MCR301 (trade name, manufactured by Anton Paar GmbH). As the measuring conditions, shear rate of 10 (1/s) and rate of temperature rise of 5° C./5 seconds were used.

The results are shown in Table 1.

TABLE 1

| | Viscosity(m Pa · s) | |
|---|---|---|
| Temperature (° C.) | 101 (containing urea, 17.2% by mass) | c11 (no low-molecular compound) |
| 25 | 5.1 | 4.1 |
| 30 | 4.6 | 3.8 |
| 40 | 4.1 | 3.3 |
| 50 | 4.0 | 3.0 |
| 60 | 7.3 | 2.8 |
| 65 | 136.0 | 3.5 |
| 70 | 240.0 | 4.0 |
| 80 | 164.0 | 121.0 |
| 90 | 182.0 | 361.0 |

It is understood that the thickening temperature of the Black ink 101 is reduced by addition of a low molecular compound (urea), compared to that of c11.

Example II, Comparative Example II

Black inks shown in Table 2 were ejected from a piezoelectric head (384 nozzles) in a single pass mode at resolution of 600 dpi in a droplet amount of from 7 to 8 μl per liquid droplet. Thereby, five-step 1 cm×1 cm halftone dot images of which halftone percentage is 100%, 80%, 60%, 40% and 20% respectively were printed in order on an NPi high-quality paper (trade name, manufactured by Nippon Paper Industries Co., Ltd.). Heating was carried out by hot air before the ink lands so that the NPi high-quality paper is heated to the temperature shown in Table 2. The temperature of the NPi high-quality paper is a value obtained by measuring a temperature at the side of a recording face (the side at which ink droplets land) in the mid position between a heat source and the piezoelectric head using an infrared thermometer (IR-66B (trade name), manufactured by MK Scientific, Inc.).

Evaluation of the printed matters was conducted as follows.

(Evaluation of Bleeding)

Printed images of which halftone percentage is 20% were observed by a microscope (20 magnifications). According to the following criterion, the printed images were compared in such a standpoint that the recording sheet was heated or not. The results are shown in Table 2.

A: Bleeding of almost dots is suppressed.
B: Bleeding of about half dots is suppressed.
C: Bleeding of a part of dots is suppressed.
D: Almost dots are bleeding.

(Evaluation of Penetration of Ink)

The reverse side of the printed images was visually observed. Evaluation was conducted according to the following criterion. The results are shown in Table 2. The less the penetration of the ink through the paper is, the higher the color density of the printed surface becomes, which is preferable.

A: The penetration of the ink through the paper is apparently reduced by heating.
B: The penetration of the ink through the paper is somewhat reduced by heating.
C: The penetration of the ink through the paper is slightly reduced by heating.
D: The penetration of the ink through the paper is seldom reduced by heating.

(Evaluation of Ejection Delay)

The first printed portion of the printed images was visually observed. Existence or nonexistence of ejection delay (a phenomenon in which the first printed portion is difficult to be printed) was determined. The less the delay of ejection is, the better the ejectability is. The results are shown in Table 2.

TABLE 2

| | Ink | Polymer | Low-Molecular Compound | | Heating Temperature (° C.) | Dot Bleeding | Penetration of Ink | Ejection Delay |
|---|---|---|---|---|---|---|---|---|
| | | | Kind | Addition Amount (mass %) | | | | |
| Example II-1 | 101 | PE-78(*) | Urea | 17.2 | 65 | A | A | Non-existence |
| Example II-2 | 101 | PE-78 | Urea | 17.2 | 70 | A | A | Non-existence |
| Example II-3 | 101 | PE-78 | Urea | 17.2 | 80 | A | A | Non-existence |
| Example II-4 | 102 | PE-78 | Urea | 8.6 | 70 | A | A | Non-existence |
| Example II-5 | 103 | PE-78 | 2-pyrrolidone | 17.2 | 70 | A | A | Non-existence |
| Example II-6 | 104 | PE-78 | Thiourea | 17.2 | 70 | A | B | Non-existence |
| Comparative example II-1 | c11 | PE-78 | — | — | No heating | D | D | Existence |
| Comparative example II-2 | c11 | PE-78 | — | — | 65 | D | D | Existence |

(*)NEWPOL PE-78 (trade name, manufactured by Sanyo Chemical Industries, Ltd.) Tri-block polymer of PEO-PPO-PEO From Table 2, occurrence of both dot bleeding and penetration of the ink through the paper and in addition, occurrence of ejection delay are found in Comparative Examples II-1 and II-2 in each of which the comparative ink c11 is used. Even though a recording sheet is heated to 65° C., improvement is not found (Comparative Example II-2). In contrast, in Examples II-1 to II-6 in each of which the ink of the present invention is used and recording is carried out according to the ink-jet recording method using the same, it is understood that dot bleeding of the printed matter is suppressed; penetration of the ink through the paper is reduced; a density of the printed surface is increased; and in addition, a good ejectability of the ink is achieved, and resultantly printing can be performed without occurrence of ejection delay.

Further, even though the heating temperature of the recording sheet is reduced to relatively lower temperatures of 65° C., 70° C., and 80° C., excellent evaluation results are achieved. Resultantly, such excellent effects are produced that favorable images can be printed while reducing a load on the ink-jet recording apparatus.

In addition, the dot shape of each of the printed matters obtained in Examples II-1 to II-6 was a trapezoid in section, and the density was uniform, which resulted in favorable image quality.

Having described our invention as related to the present embodiments, it is our intention that the present invention not be limited by any of the details of the description, unless otherwise specified, but rather be construed broadly within its spirit and scope as set out in the accompanying claims.

This non-provisional application claims priority under 35 U.S.C. §119 (a) on Patent Application No. 2010-050975 filed in Japan on Mar. 8, 2010, which is entirely herein incorporated by reference.

I claim:
1. An ink-jet pigment ink, comprising:
at least one low-molecular compound represented by the following formula (1-1) or formula (2-1):

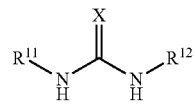

Formula (1-1)

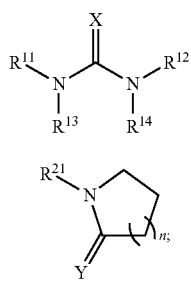

Formula (2-1)

and
a polymer having at least one polyethylene oxide block structure,
wherein a viscosity of the ink jet pigment ink at 65° C. increases to 100 mPa·s or more in response to heating,
wherein, in formula (1-1), $R^{11}$, $R^{12}$, $R^{13}$ and $R^{14}$ each independently represent a hydrogen atom or an alkyl group having 1 to 4 carbon atoms; $R^{13}$ and $R^{14}$ may be bonded to each other to form a ring; and X represents an oxygen atom or a sulfur atom, and
wherein, in formula (1-2), $R^{21}$ represents a hydrogen atom or an alkyl group having 1 to 4 carbon atoms; Y represents an oxygen atom or a sulfur atom; and n represents an integer of 1 to 3.

2. The ink-jet pigment ink according to claim 1, wherein the low-molecular compound is represented by the following formula (1-2) or formula (2-2):

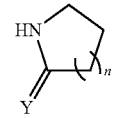

Formula (1-2)

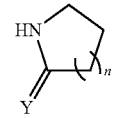

Formula (2-2)

wherein, in formula (1-2), $R^{11}$ and $R^{12}$ each independently represent a hydrogen atom or an alkyl group having 1 to 4 carbon atoms; and X represents an oxygen atom or a sulfur atom; and
wherein, in formula (2-2), Y represents an oxygen atom or a sulfur atom; and n represents an integer of 1 to 3.

3. The ink-jet pigment ink according to claim 2, wherein the low-molecular compound is represented by the following formula (1-3) or formula (2-3):

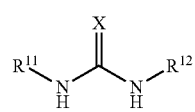

Formula (1-3)

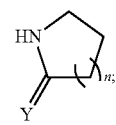

Formula (2-3)

wherein, in formula (1-3), $R^{11}$ and $R^{12}$ each independently represent a hydrogen atom or an alkyl group having 1 to 4 carbon atoms; and
wherein, in formula (2-3), n represents an integer of 1 to 3.

4. The ink-jet pigment ink according to claim 3, wherein the low-molecular compound is at least one kind selected from the group consisting of urea and 2-pyrrolidone.

5. The ink-jet pigment ink according to claim 1, wherein a content of the low-molecular compound is more than 7% by mass with respect to the total amount of the ink-jet pigment ink.

6. The ink-jet pigment ink according to claim 1, wherein the polymer having at least one polyethylene oxide block structure is a tri-block polymer of polyethylene oxide-polypropylene oxide-polyethylene oxide.

7. An ink-jet recording method, comprising the step of: printing on a recording sheet by ejecting ink droplets from an orifice of a recording head in response to recording signals,
wherein the ink is the ink-jet pigment ink according to claim 1, and wherein the recording sheet is heated to 65° C. or higher before the ink droplets land, or at the time of landing.

8. A printed matter comprising a recording sheet having been printed thereon by the ink jet recording method according to claim 7.

9. An ink-jet recording apparatus, comprising: a recording unit,
wherein the recording unit is equipped with an ink-containing section that contains an ink and a head section that ejects the ink in the form of liquid droplets,
wherein the ink is the ink-jet pigment ink according to claim 1, and wherein the ink-jet recording apparatus further comprises a heating and retaining means that maintains the temperature of a recording sheet at 65° C. or higher by heating before the ink droplets land, or at the time of landing.

* * * * *